United States Patent [19]

Cadwell, Jr. et al.

[11] Patent Number: 4,671,811
[45] Date of Patent: Jun. 9, 1987

[54] LAMINAR FLOW CLEAN ROOM

[75] Inventors: George H. Cadwell, Jr., Blounts Creek; Clarence B. Pittman, Pinetown, both of N.C.

[73] Assignee: Flanders Filters, Inc., Washington, N.C.

[21] Appl. No.: 733,971

[22] Filed: May 14, 1985

Related U.S. Application Data

[63] Continuation-in-part of Ser. No. 584,819, Feb. 29, 1984.

[51] Int. Cl.⁴ .......................................... B01D 46/00
[52] U.S. Cl. .................................... 55/355; 52/484; 52/665; 55/385 A; 55/483; 55/484; 55/494; 55/502; 55/DIG. 29
[58] Field of Search ............... 55/385 A, 355, 483, 55/484, 494, 502, DIG. 29; 52/484, 664, 665, 669, 710, 144

[56] References Cited

U.S. PATENT DOCUMENTS

| | | | |
|---|---|---|---|
| 407,376 | 7/1889 | Smith | 52/484 X |
| 2,252,724 | 8/1941 | Myers | 55/483 X |
| 2,659,807 | 11/1953 | Wakefield | 52/484 X |
| 2,730,942 | 1/1956 | Peterson | 52/144 X |
| 2,753,440 | 7/1956 | Wakefield . | |
| 2,857,631 | 10/1958 | Zingone | 52/484 X |
| 3,013,644 | 12/1961 | Smith et al. | 52/665 X |
| 3,232,021 | 2/1966 | Wilson | 52/484 X |
| 3,241,280 | 3/1966 | Kreuzer | 52/484 X |
| 3,321,877 | 5/1967 | Alexieff . | |
| 3,471,981 | 10/1969 | Segil et al. . | |
| 3,486,311 | 12/1969 | Allan, Jr. | 55/385 A X |
| 3,491,500 | 1/1970 | Fischer . | |
| 3,785,110 | 1/1974 | Galloway et al. | 52/484 X |
| 3,791,089 | 2/1974 | Alderman | 52/484 |
| 3,835,614 | 9/1974 | Downing, Jr. | 52/666 |
| 3,843,764 | 10/1974 | Grawey et al. | 156/329 X |
| 3,848,385 | 11/1974 | Thompson | 52/484 X |
| 3,986,850 | 10/1976 | Wilcox | 55/385 A X |
| 4,047,348 | 9/1977 | McSweeney | 52/484 |
| 4,082,525 | 4/1978 | Allan | 55/502 X |
| 4,178,159 | 12/1979 | Fecteau | 55/385 A |
| 4,229,913 | 10/1980 | Corrigan | 52/484 X |
| 4,233,044 | 11/1980 | Allan | 55/483 X |
| 4,409,889 | 10/1983 | Burleson | 55/385 A X |
| 4,511,380 | 4/1985 | Fetter | 55/483 X |

FOREIGN PATENT DOCUMENTS 849847  9/1960  United Kingdom ................. 52/484

OTHER PUBLICATIONS

The Condensed Chemical Dictionary, 10th ed., Van Nostrand Reinhold Co., New York, N.Y., 1981, pp. 921-922.

Primary Examiner—Kathleen J. Prunner
Attorney, Agent, or Firm—Bell, Seltzer, Park & Gibson

[57] ABSTRACT

A clean room having provision for supplying filtered air vertically therethrough under substantially laminar flow conditions is disclosed, and which is characterized by the substantial absence of migration of dust or dirt particles laterally through the room. The clean room includes a filter bank comprising a supporting latticework composed of a plurality of interconnected members which define rectangular open areas, and a plurality of high efficiency air filters positioned on the supporting latticework. Each of the members of the latticework has a generally V-shaped outline in cross section with the angular extent of the V-shaped outline being adapted to provide a substantially laminar flow therealong, and so as eliminate any substantial turbulence below the members of the latticework. Such turbulence has been found to entrain dust or dirt particles and move the same laterally through the room, and the elimination of such turbulence effectively eliminates the lateral migration problem. A sealant is disposed between the filters and supporting latticework, which comprises an essentially non-volatile and non-hardening polysiloxane gum.

14 Claims, 33 Drawing Figures

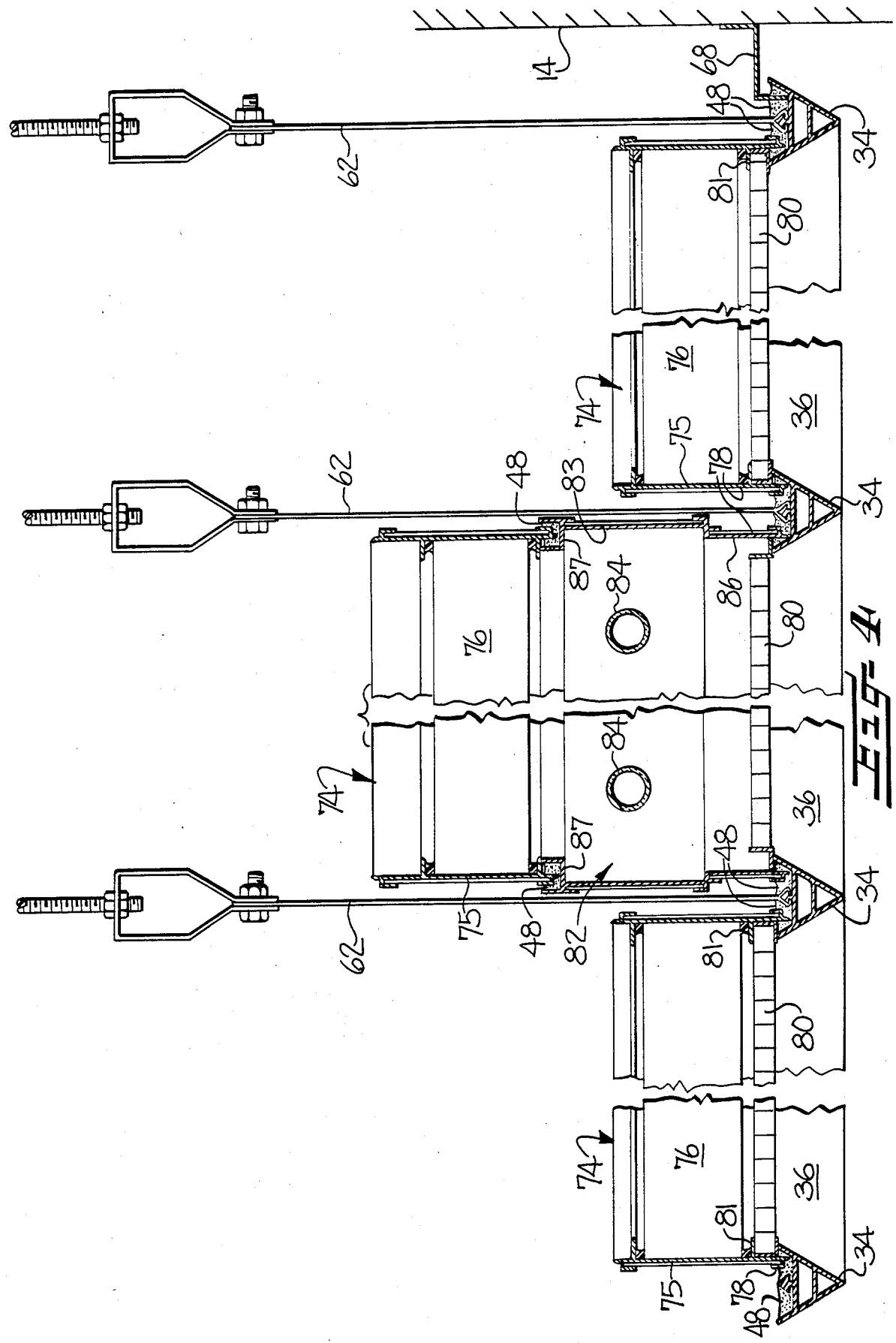

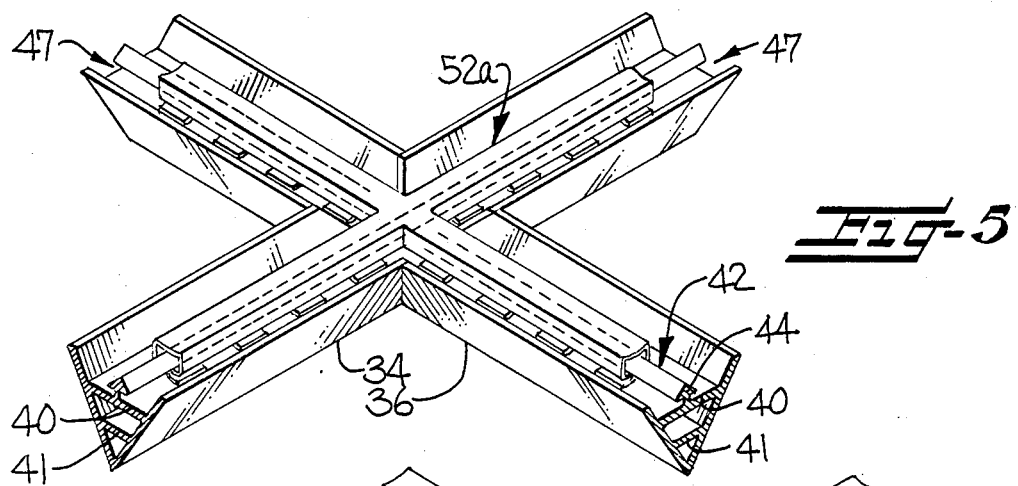
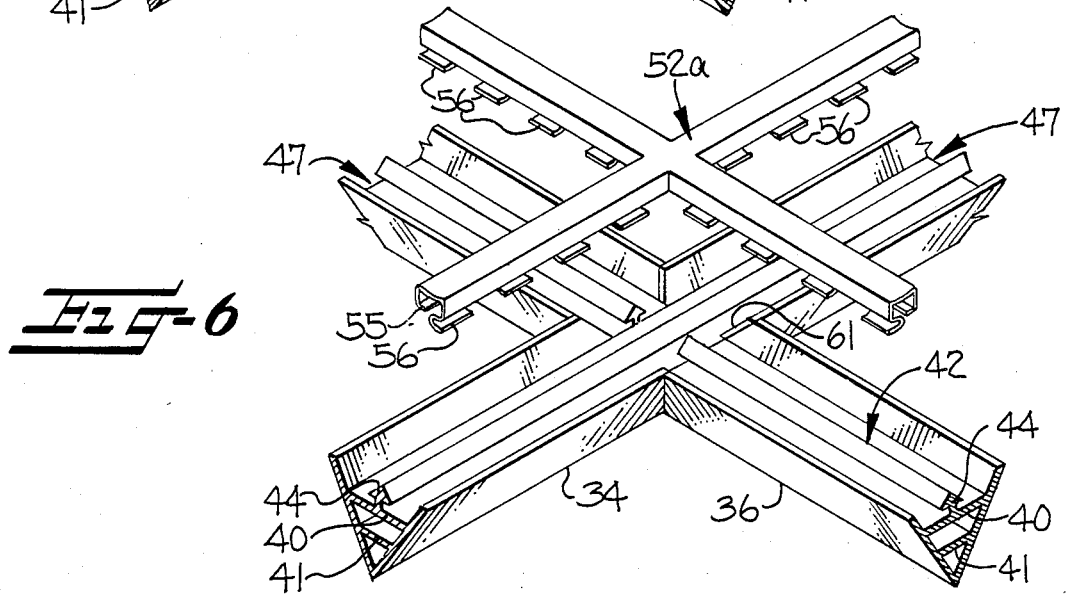
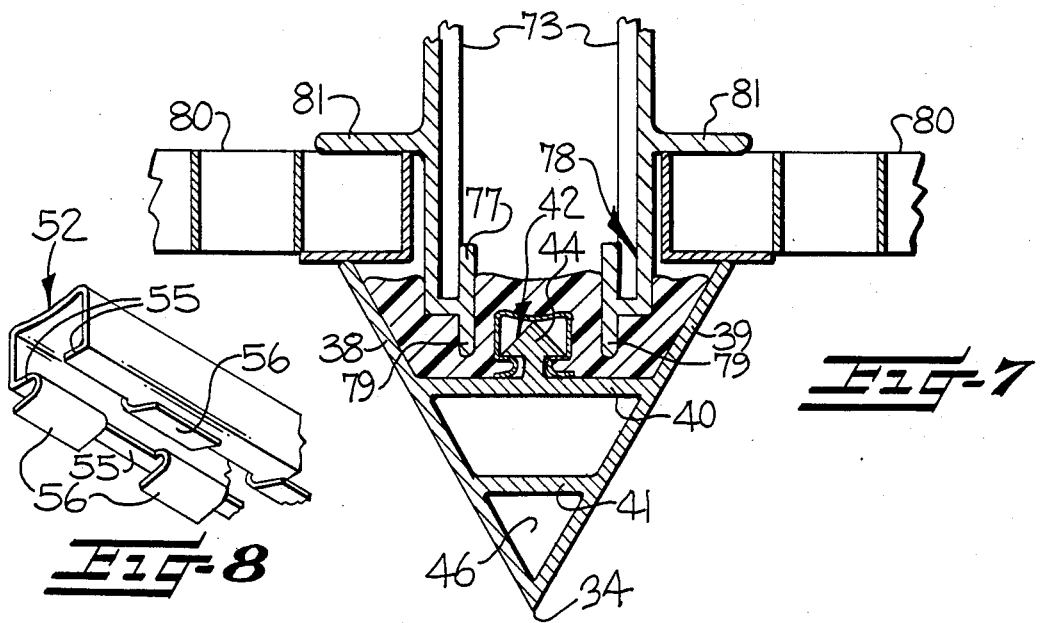

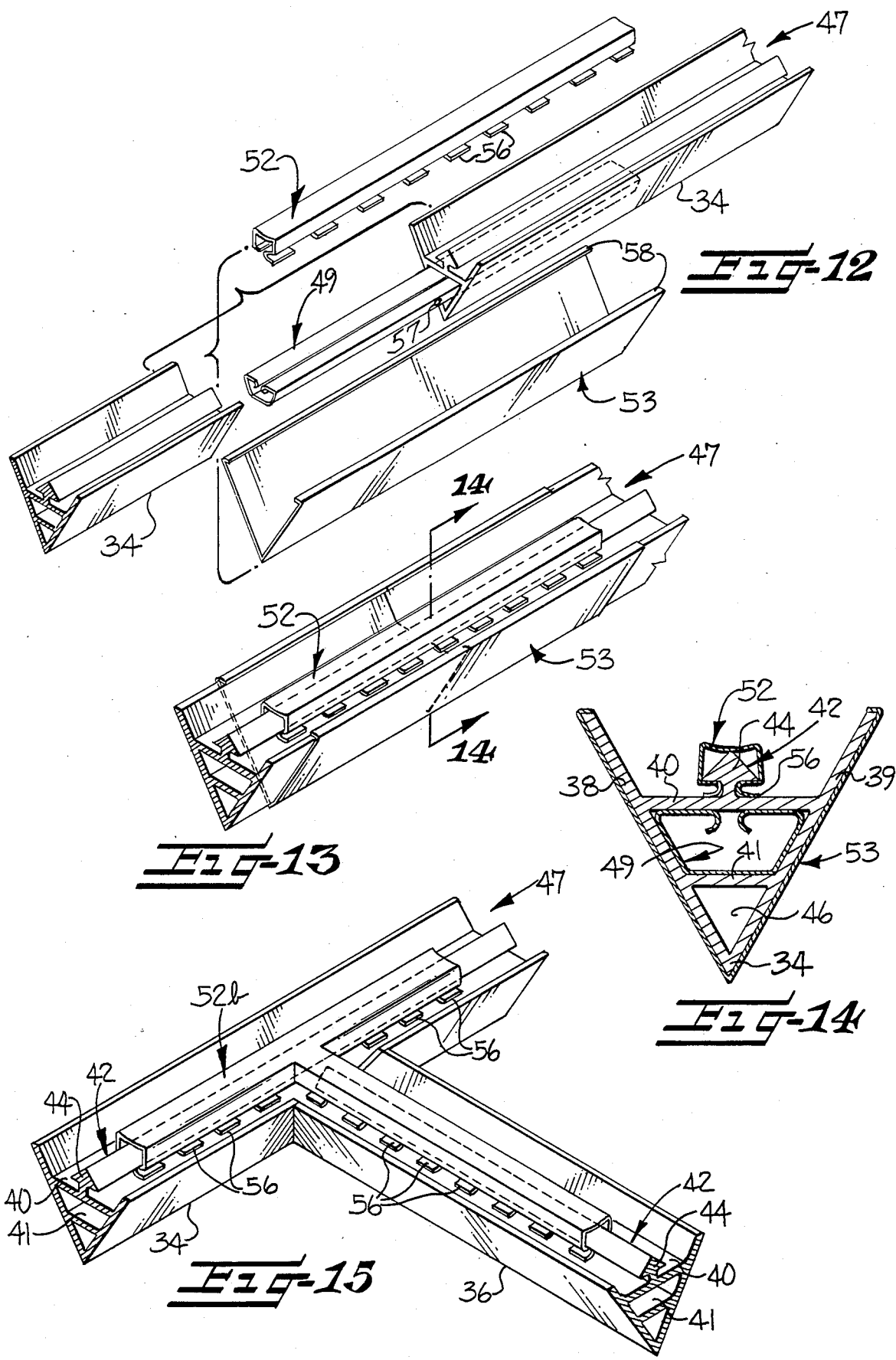

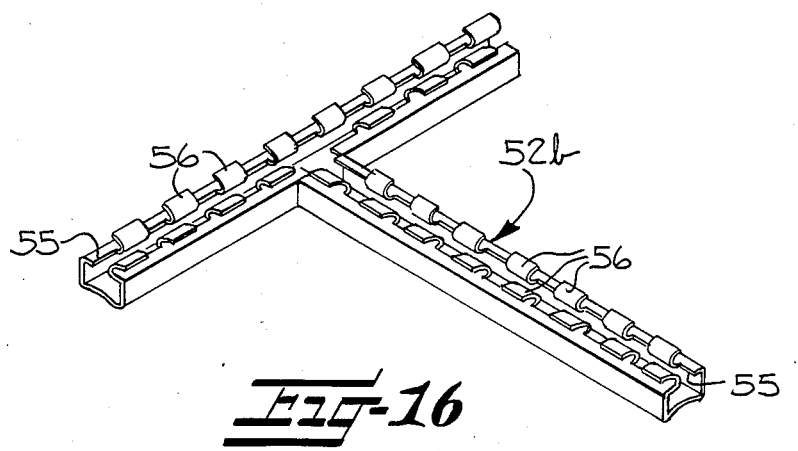
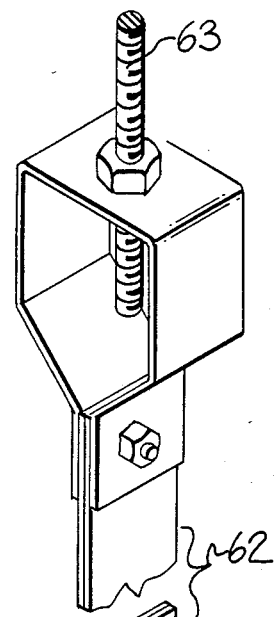
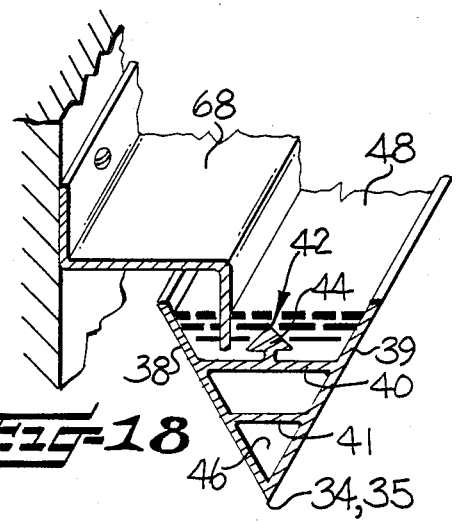
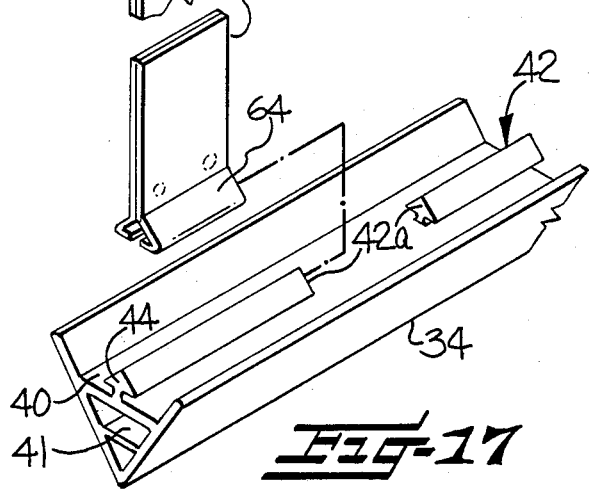
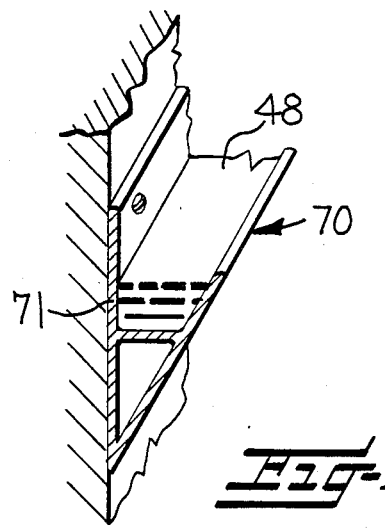

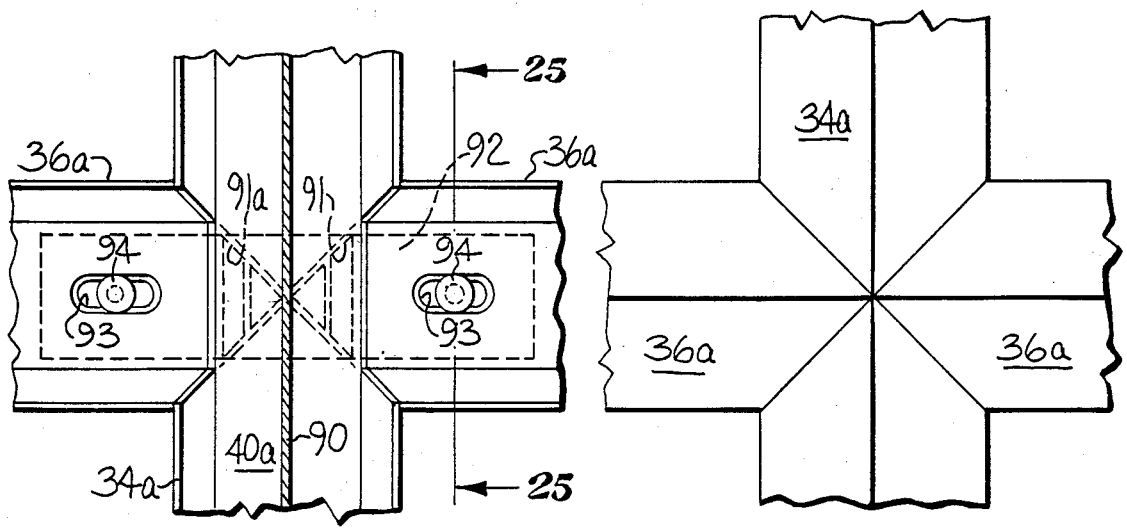
Fig-22  Fig-23
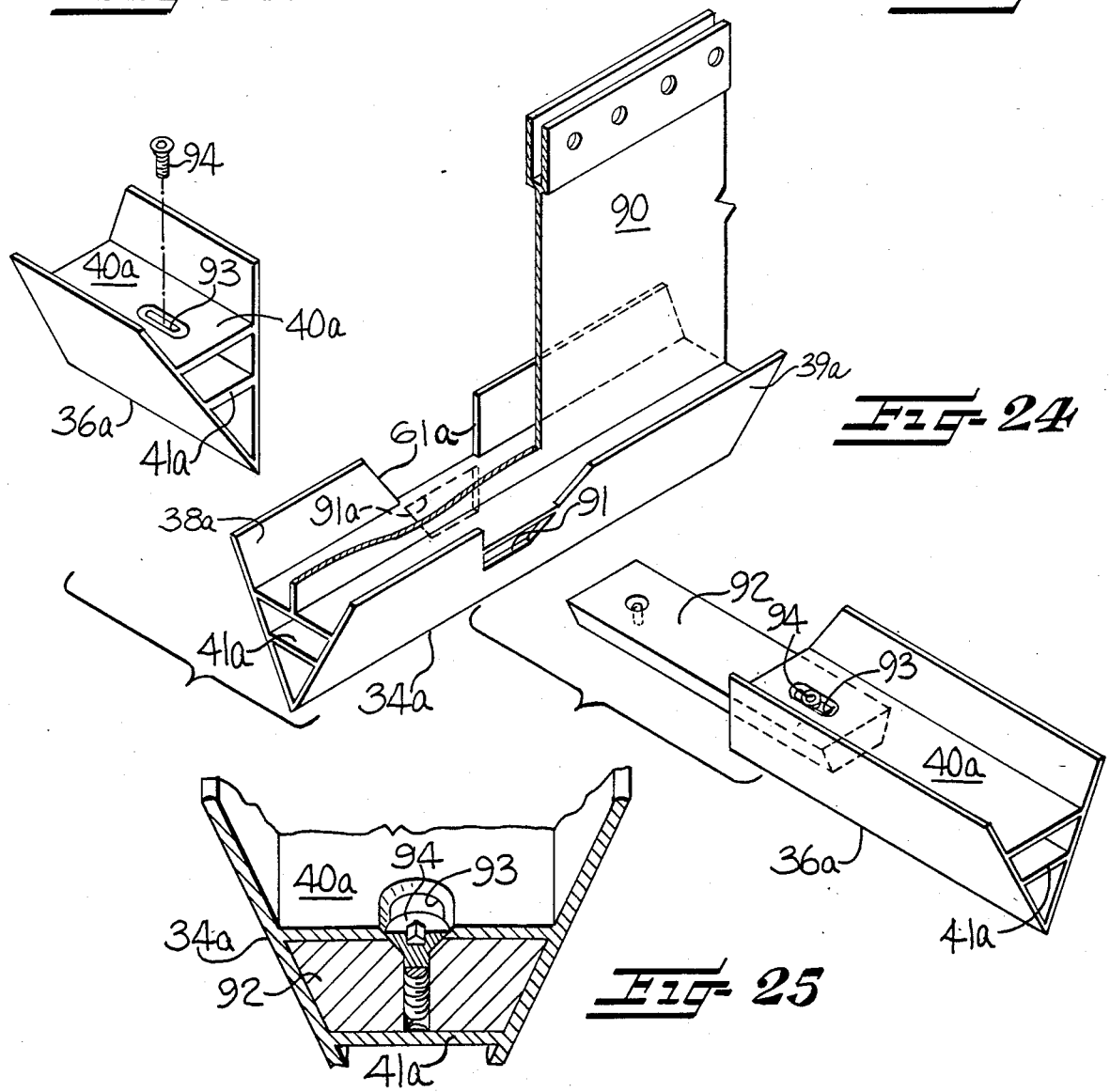
Fig-24
Fig-25

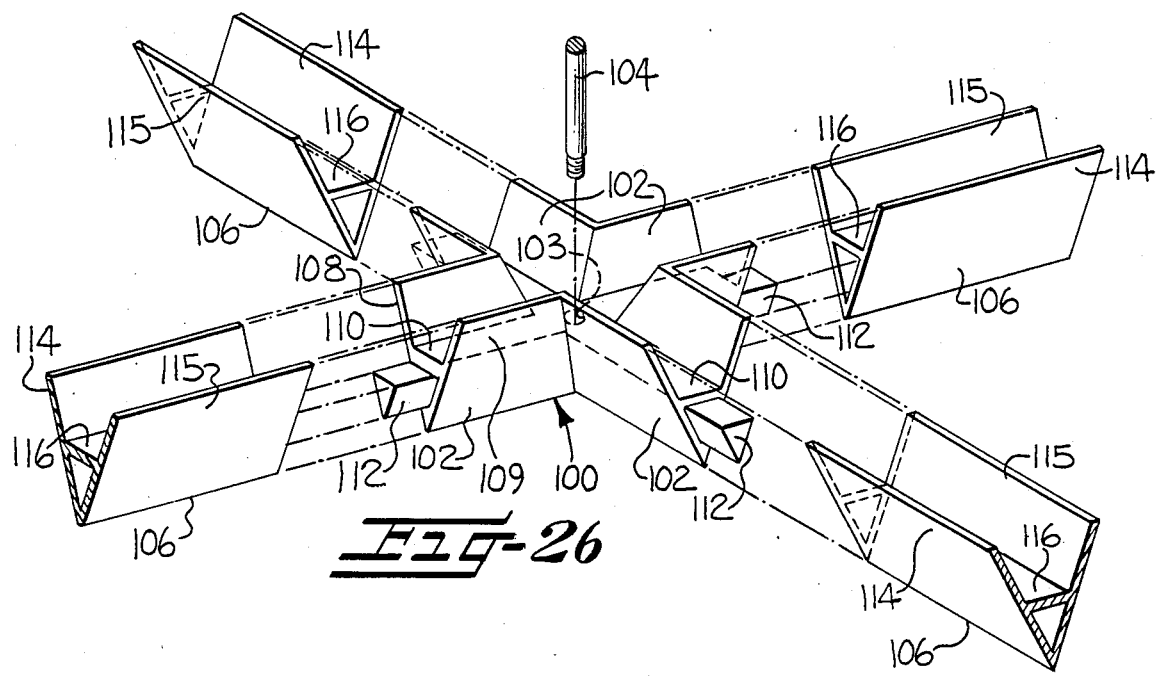
Fig-26
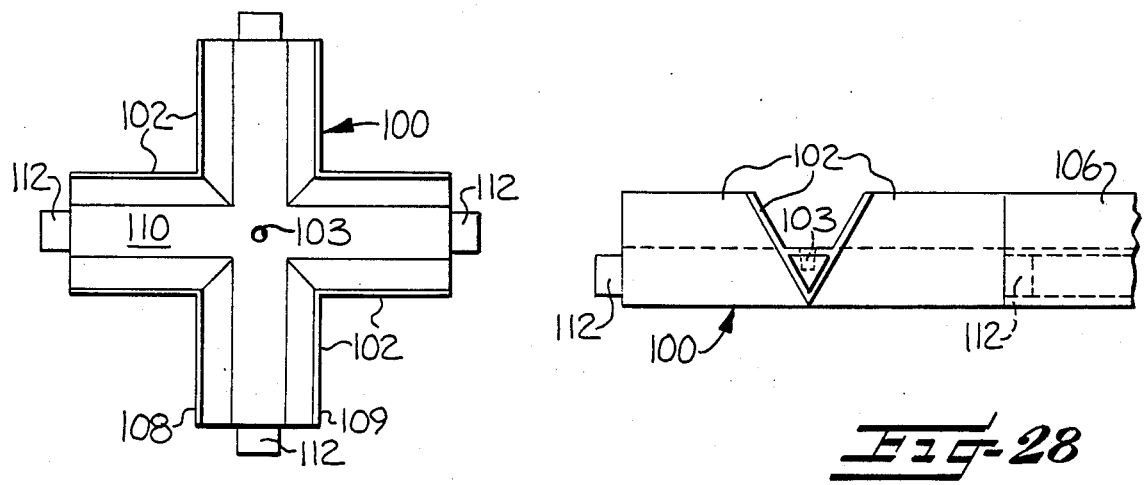
Fig-27
Fig-28
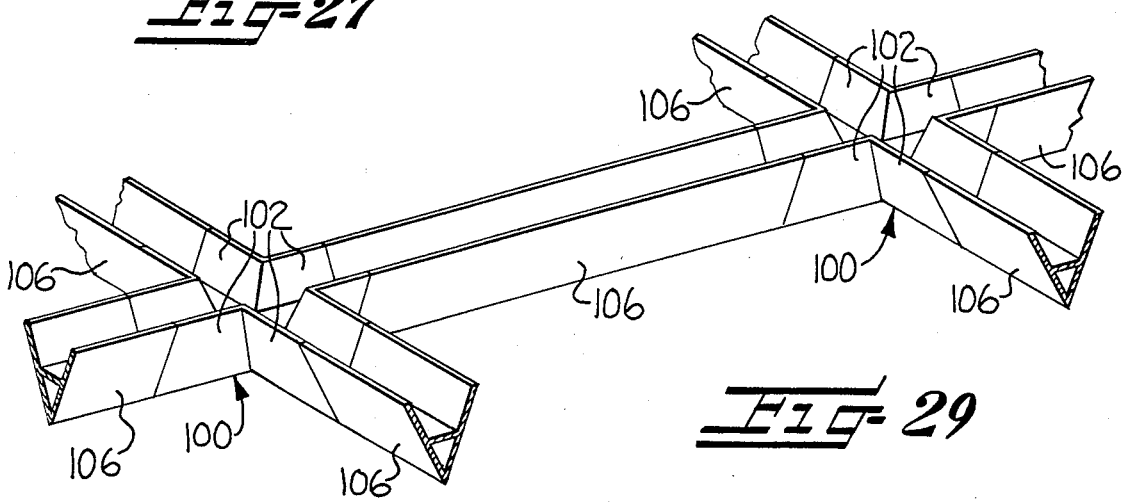
Fig-29

LAMINAR FLOW CLEAN ROOM

This is a continuation-in-part of copending application Ser. No. 584,819, filed Feb. 29, 1984.

The present invention relates to a clean room having provision for supplying filtered air to a work area under substantially laminar flow conditions.

The need for a controlled, contaminant-free work area is well recognized in industry wherever precision manufacturing and assembly operations are conducted, and several clean room designs have been developed for this purpose. In one such present design, the clean room comprises a room-like enclosure having a filter bank suspended from and overlying the entire ceiling. The filter bank includes a number of individual high efficiency filters supported on a rectangular latticework, and a blower introduces air under pressure into the open plenum chamber formed between the filter bank and ceiling. The air then passes downwardly through the filters and vertically through the room. Appropriate ducts are provided in or adjacent the floor for conveying the air back to the blower for recirculation.

To seal the filters to the latticework, a gasket of neoprene rubber or other similar material is commonly provided, which is secured to the front periphery of the filter frame, and which is designed to contact an inwardly turned peripheral flange on the latticework. A suitable clamping mechanism is then provided to press the filter frame and its front gasket against the flange to compress the gasket and thereby prevent leakage of air around the outside of the filter. Such gasket seals have proven to be unsatisfactory in many applications however, since the gasket material often deteriorates and unfiltered air leaks may develop across the gasket, or at the butt end joint of the gasket.

In U.S. Pat. No. 3,486,311 to Allan, and U.S. Pat. No. 3,986,850 to Wilcox, both of which are commonly owned with the present invention, there is disclosed a filter bank assembly for a vertical laminar flow clean room, which comprises a horizontally suspended filter supporting latticework composed of corner connectors and a plurality of U-shaped channels extending between the connectors so as to define a plurality of rectangular open areas. A sealing fluid of relatively high consistency is disposed in the channels and connectors, and a high efficiency particulate air (HEPA) filter is adapted to be supported over each rectangular open area of the latticework. Each filter includes a peripheral skirt adapted to be received in the U-shaped channel and the connector so as to form a continuous peripheral seal with the fluid. In commercial practice, the fluid has comprised a silicone base grease having a viscosity of about 30,000 centipoise, although a silicone based grease having a viscosity up to about 150,000 centipoise has been suggested for this use, note the above referenced patent to Wilcox.

The fluid sealing structure of the above patents represents a vast improvement over the previously employed gasket seals, and has met with a great deal of commercial success since a near perfect and non-deteriorating seal is achieved under normal operating conditions. However, under certain unusual operating conditions, the fluid sealant tends to dry out, which can in time result in cracks and leaks, and further, the drying out (or out-gassing) may result in undesirable gases being introduced into the filtered airstream.

A further and long recognized problem associated with clean rooms of the described type is the fact that dust or dirt particles which are periodically introduced into one area of the room often migrate to distant areas of the room where they contaminate sensitive products or materials. Thus, for example, when persons or raw materials enter the room through a door, the particle count will often increase at a distant location in the room. The cause for this migration of particles has not been understood, since one would expect that under laminar flow conditions the particles introduced into the room would move directly downwardly, and be removed through the exhaust duct in or adjacent the floor.

In accordance with the present invention, the cause of the migration of dust or dirt particles through the clean room has been discovered, and a novel structure for the filter bank has been developed which substantially alleviates the problem. More particularly, the present invention involves the discovery that migration of the particles occurs within the zone of turbulence formed for a short distance below each of the connectors and channels of the supporting latticework of the filter bank, and that this turbulence tends to attract and entrain the particles and to move the entrained particles laterally in the length direction of the channels to distant areas of the room, where they are eventually released and move downwardly. The present invention also involves the further discovery that by substantially reducing or eliminating the zone of turbulence beneath the connectors and channels of the supporting latticework, the problem of migration of particles is significantly alleviated.

It is accordingly an object of the present invention to provide a clean room of the described type which substantially alleviates the problem of particle migration, so that distant areas of the room are unaffected when particles are introduced in one area of the room.

It is a further object of the present invention to provide a clean room having a supporting latticework for a filter bank which is of simple and inexpensive construction, and which is relatively easy to assemble.

It is still another object of the present invention to provide a clean room of the described type and having a sealant which is adapted to provide an essentially leak proof, non-deteriorating, and non-drying seal between the filters and the supporting latticework.

These and other objects and advantages are achieved in the embodiments of the invention described herein by the provision of a clean room which comprises an enclosure including a top wall, a bottom wall, and bounding side walls, a filter bank positioned parallel to and spaced below the top wall, with the filter bank comprising a supporting latticework defining a plurality of rectangular open areas, and a plurality of high efficiency air filters positioned on the supporting latticework with one of the filters covering each of the open areas. Blower means is provided for introducing air above each of the filters of the filter bank such that the air flows downwardly through the filters at a predetermined flow rate. Further, and in accordance with the preferred embodiment of the present invention, the supporting latticework is made up of interconnected members having a generally V-shaped outline in cross section, with the angular extent of the V-shaped outline being such as to provide a substantially laminar flow therealong for the particular value of the air flow rate, and so as to substantially eliminate turbulence below the members of the latticework. By the substantial elimination of the turbulence, the tendency of the particles to be moved laterally through the room is significantly alleviated.

In the illustrated specific embodiments, each filter includes a peripheral flange or skirt which has a continuous cross sectional outline corresponding to that of the associated open area, and so that the forward edge portion of the peripheral flange is positioned within the upper portion of the members and sealably embedded in the sealant. In addition, the sealant comprises an essentially non-volatile and non-hardening moldable gum-like plastic material having a consistency substantially the same as modeling clay, which has been found to provide an essentially leak proof, non-deteriorating and non-drying seal between the filters and the supporting latticework.

Some of the objects and advantages of the invention having been stated, others will appear as the description proceeds, when taken in connection with the accompanying drawings, in which FIG. 1 is a sectioned side elevation view of a clean room which embodies the features of the present invention;

FIG. 4 is a sectional side elevation view of the filter bank;

FIG. 5 is a fragmentary perspective view of one of the generally X-shaped interconnections of the latticework;

FIG. 6 is an exploded view of the interconnection shown in FIG. 5;

FIG. 7 is a cross sectional view of one of the members of the latticework of the filter bank, together with the adjacent portions of the filter frames and protective grilles;

FIG. 8 is a fragmentary perspective view of a snap-on retainer for joining the members of the latticework;

FIG. 12 is an exploded perspective view of an end to end interconnection of the members of the latticework;

FIG. 13 is a perspective view of an assembled end to end interconnection;

FIG. 14 is a sectional view taken substantially along the line 14—14 of FIG. 13;

FIG. 15 is a perspective view of a T-shaped interconnection;

FIG. 16 is a perspective view of a snap-on retainer used in the T-shaped interconnection of FIG. 15;

FIG. 17 is an exploded fragmentary perspective view of one of the members of the latticework and a supporting bracket;

FIG. 18 is a fragmentary sectioned perspective view of the interconnection between a side wall and a peripheral member of the latticework;

FIG. 19 is a view similar to FIG. 18 but illustrating an alternative embodiment of the side wall interconnection;

FIG. 22 is a fragmentary and sectioned top plan view of one of the generally X-shaped interconnections of the latticework of FIG. 20;

FIG. 23 is a bottom plan view of the interconnection shown in FIG. 22;

FIG. 24 is an exploded perspective view of the interconnection shown in FIG. 22;

FIG. 25 is a perspective sectional view taken substantially along the line 25—25 of FIG. 22;

FIG. 26 is an exploded perspective view of a connector and the associated channels which form an alternative embodiment of the supporting latticework of the filter bank in accordance with the present invention;

FIG. 27 is a plan view of one of the generally X-shaped connectors of the filter bank shown in FIG. 26;

FIG. 28 is a side elevation view of the connector shown in FIG. 26, and further illustrating one interconnected channel;

FIG. 29 is a fragmentary perspective view illustrating the connector of FIG. 26 and interconnected channels;

Figure 30:
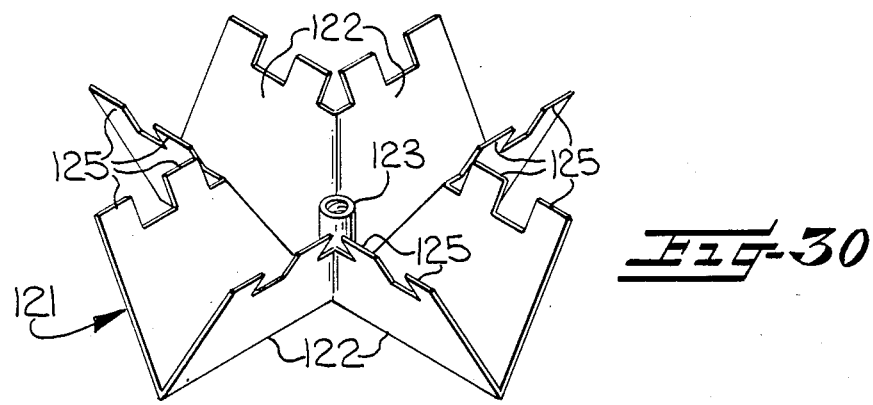
FIG. 30 is a perspective view of an alternative embodiment of the generally X-shaped connector of the supporting latticework of the present invention.
Figure 31:
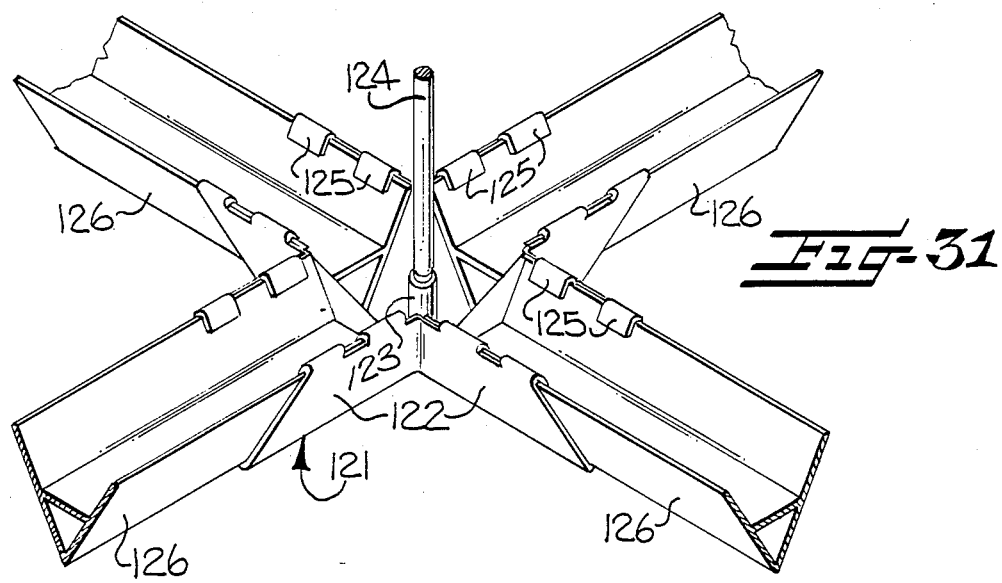
FIG. 31 is a perspective view illustrating the connector of FIG. 30 together with the interconnected channels.
Figure 32:
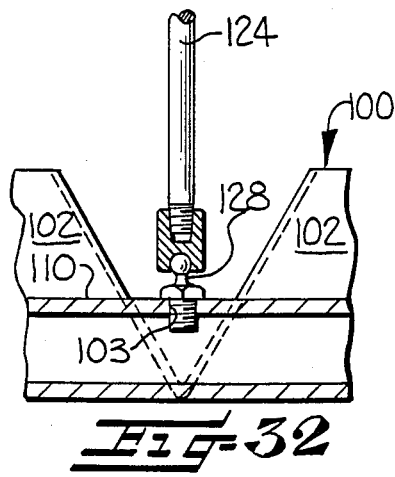
Figure 33:
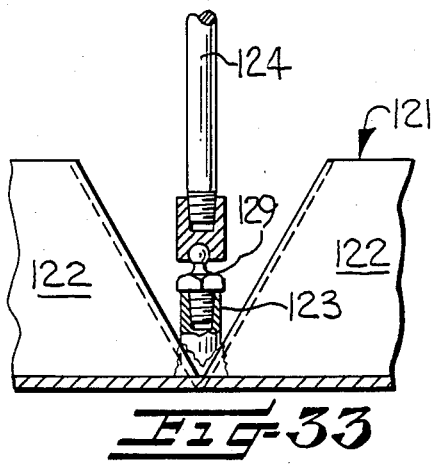

FIG. 32 is a fragmentary sectional view of a further embodiment of a connector which is similar to that shown in the embodiment of FIGS. 26-29, and which further incorporates a ball and socket interconnection with the tie rod so as to permit the leveling of the connector; and FIG. 33 is a view similar to FIG. 32, but illustrating the ball and socket interconnection applied to the embodiment of the connector shown in FIGS. 30 and 31.

Figure 1:
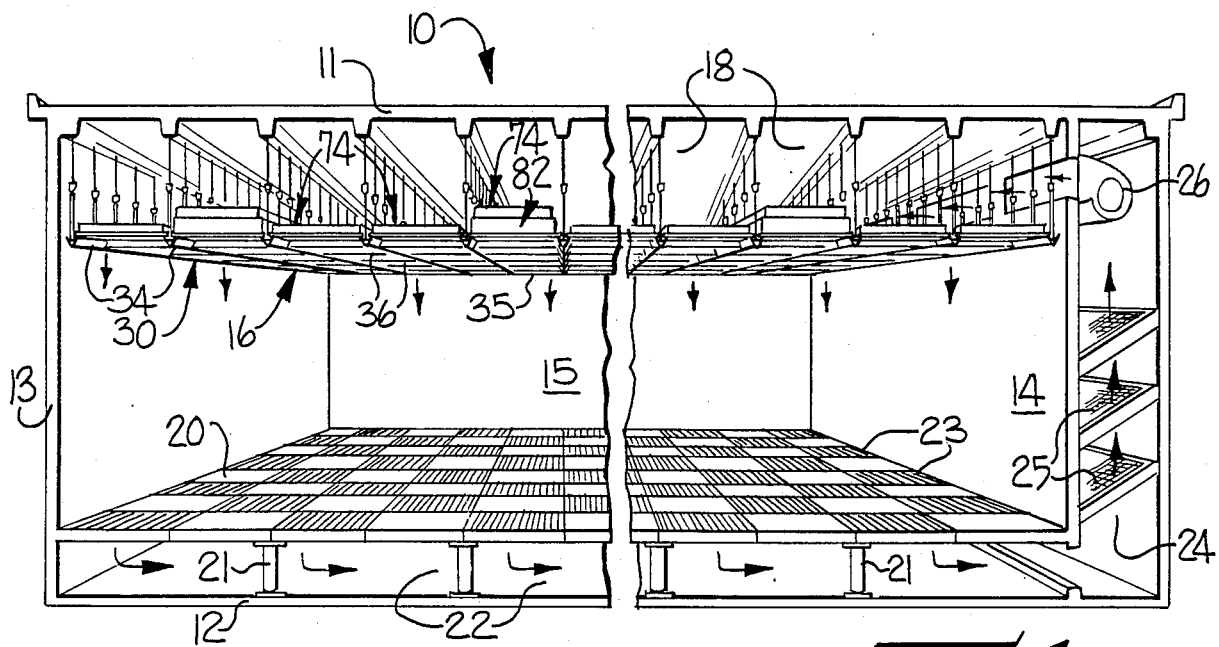
Figure 2:
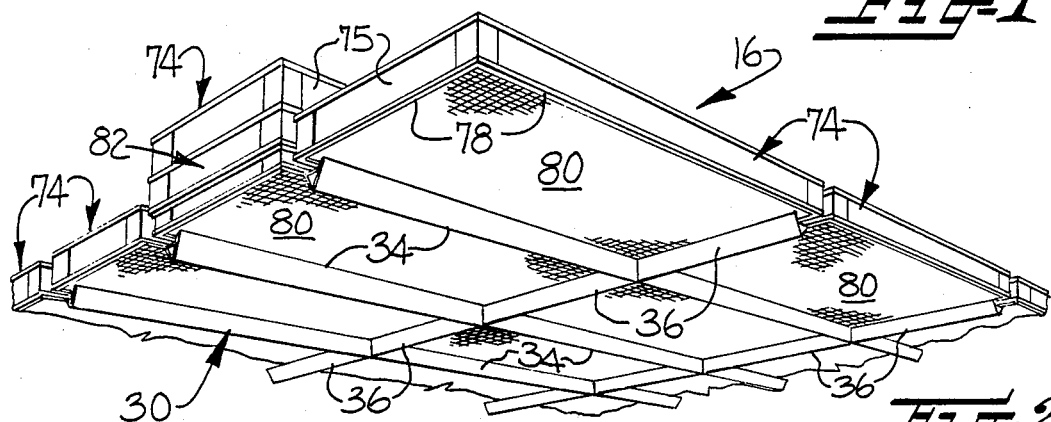
FIG. 2 is a fragmentary perspective view of the filter bank employed in the clean room shown in FIG. 1.
Figure 3:
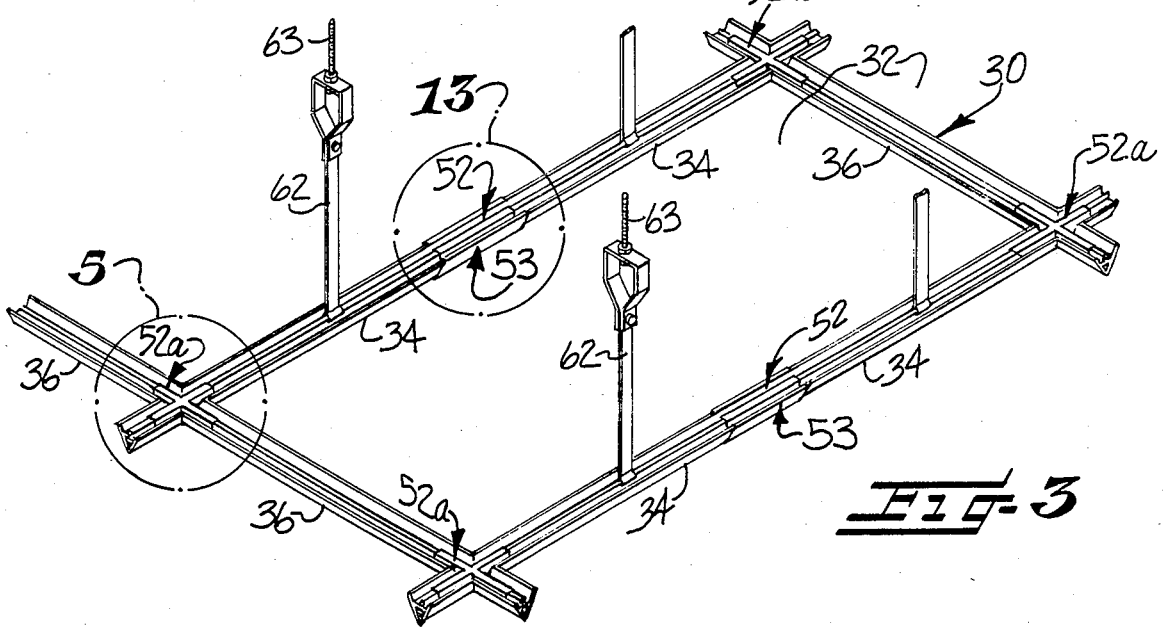
FIG. 3 is a fragmentary perspective view of a portion of the supporting latticework of the filter bank.

Referring more specifically to the drawings, FIG. 1 illustrates a clean room 10 embodying the features of the present invention. As illustrated, the clean room comprises an enclosure which includes a top wall 11, a bottom wall 12, two bounding side walls 13, 14, and a bounding end wall 15 (the opposite bounding end wall not being shown). A horizontally disposed filter bank 16 is positioned within the enclosure parallel to and spaced from the top wall 11 to define an open air supply plenum 18 therebetween. A raised floor 20 is mounted on suitable pedestals 21 above the bottom wall 12 to define a return air plenum 22, the floor 20 including a number of perforated panels 23 for permitting air to pass therethrough. The return air plenum 22 communicates with a vertical duct 24 containing a number of prefilters 25, and the vertical duct in turn communicates with the air handling unit 26 for recirculating the air into the air supply plenum 18. Typically, the air handling unit comprises a number of blowers 26, and a heating or air conditioning apparatus. Thus in use, the air delivered to the air supply plenum 18 by the air handling unit 26 passes downwardly through the filter bank 16 such that substantially all contaminants are removed immediately before the air enters the room. The air then passes vertically downwardly through the room under substantially laminar flow conditions, and through the floor 20 to the return air plenum 22. The returning air passes through the prefilters 25 where any relatively large particles in the airstream are removed, and through the blowers 26 to the air supply plenum 18.

The filter bank 16 has an area which is substantially coextensive with the area of the top wall 11, and comprises a horizontally disposed supporting latticework 30 which defines a plurality of rectangular open areas 32. In the embodiment of FIGS. 1-19, the latticework 30 comprises a plurality of parallel, laterally spaced apart lengthwise members 34 which are parallel to the side walls 13 and 14, an elongate end wall member 35 along each of the two end walls 15 of the room and thus extending perpendicular to the lengthwise members 34, and a plurality of relatively short cross members 36 extending laterally between the lengthwise members 34 and parallel to the end wall members 35. The lengthwise members 34 and two end wall members 35 are preferably continuous along the full length or width of the clean room, although they may comprise a number of sections which are joined end to end by an interconnection as described below.

Figure 11:
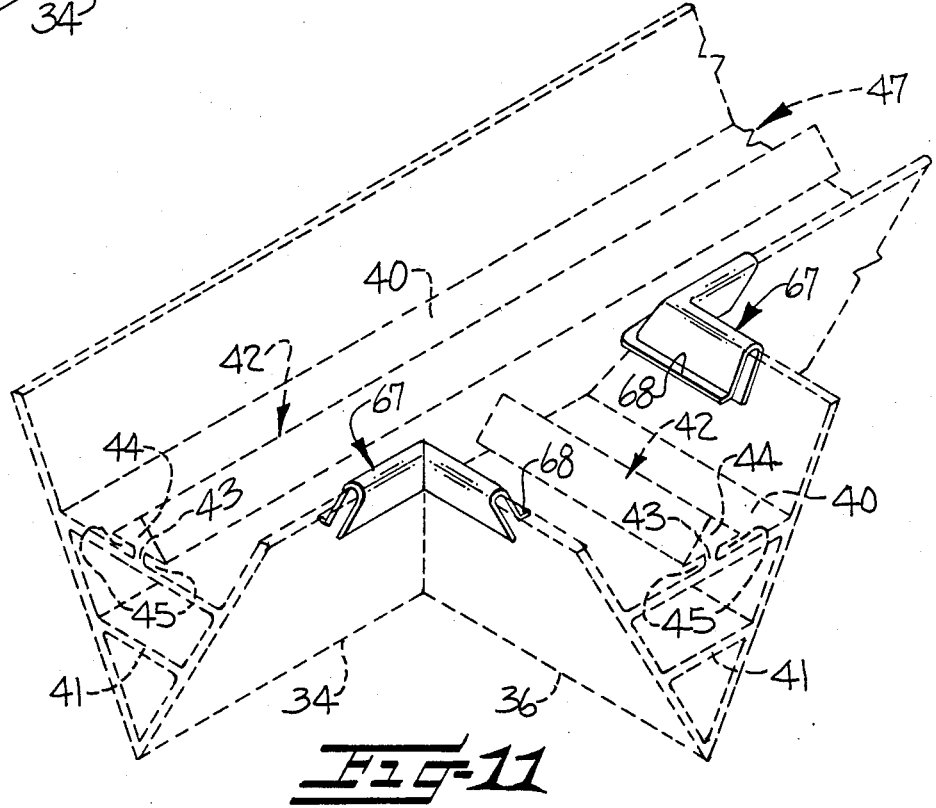
FIG. 11 is a fragmentary perspective view of a T-shaped interconnection, and specifically illustrating edge clips for maintaining the interconnection.
Figure 20:
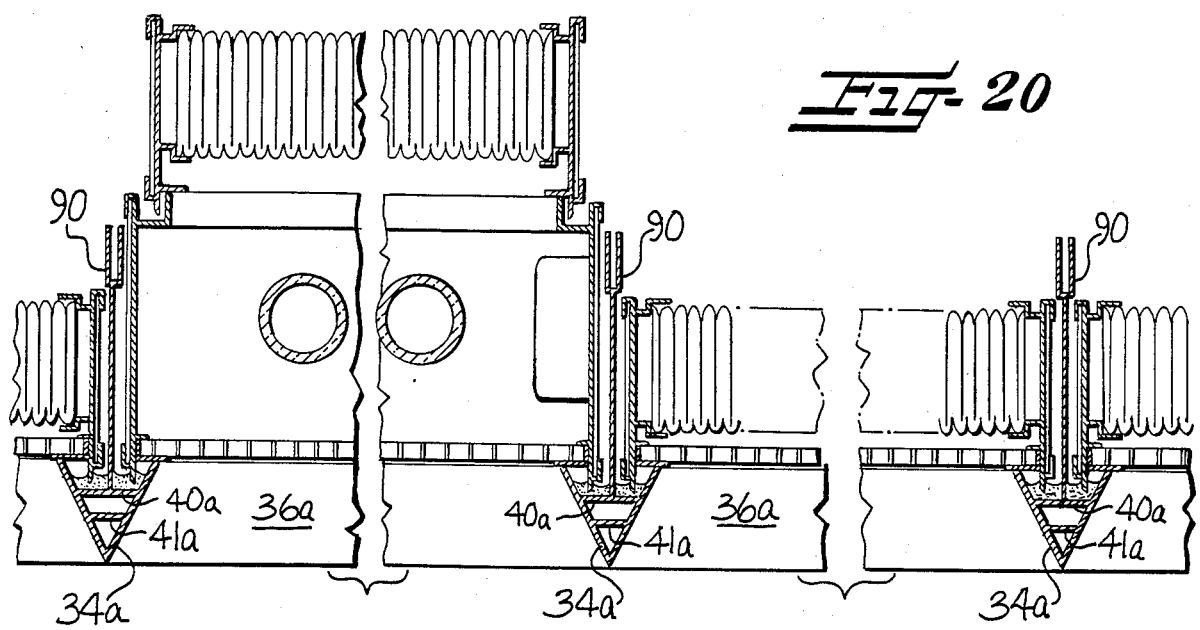
FIG. 20 is a sectional side elevation view of an alternative embodiment of the supporting latticework of the filter bank in accordance with the present invention.

The members 34, 35, and 36 have a like cross sectional outline, as best seen in FIGS. 7 and 11. In particular, each member includes a pair of outer side walls 38, 39 which are disposed in a V-shaped arrangement, an upper internal plate 40 extending horizontally between the side walls, and a lower internal plate 41 disposed parallel to and below the plate 40. Thus each member may be said to have the general form of an inverted A in cross section. The members also include an integral post 42 extending upwardly a relatively short distance from a medial portion of the plate 40 and longitudinally along the length of the member. The post 42 includes an upright leg 43 and an enlarged triangular or wedge shaped portion 44 in cross section positioned at the upper end of the upright leg 43, and so as to define outwardly facing slots 45 on opposite sides of the post and which are positioned between the upper surface of the internal plate 40 and the wedge shaped portion 44. The triangular area 46 below the lower internal plate 41 defines a hollow receptacle which extends along the length of the member, and which is adapted to serve as an electrical wire chase or the like, if desired. The area above the plate 40 defines an upwardly open receptacle 47 which is adapted to receive a sealant 48 as further described below. In addition, the open space between the upper plate 40 and lower plate 41 is adapted to receive an internal retainer 49 as further described below. The members 34, 35, 36 are preferably fabricated from a suitable metal or plastic material, and they may be extruded into the described configuration. As a specific example, the members may comprise extruded and anodized aluminum.

The lengthwise members 34 are adapted to be joined end to end by means of an interconnection as best seen in FIGS. 12-14. This interconnection includes an elongate snap-on external retainer 52, an internal retainer 49, and an outer cover 53. The snap-on retainer 52 is formed of sheet metal and is shaped to be matingly received on the wedge shaped portions 44 of the posts 42 of the aligned members 34. More particularly, the retainer 52 has a generally rectangular enclosed outline in cross section, and the bottom wall is longitudinally split to form two separated sections 55, note FIG. 8, with the sections including integral, reversely bent tabs 56 which are dimensioned so as to be adapted to be closely received in the slots 45 of the posts 42. To effect assembly, the retainer is pressed downwardly onto the posts of the aligned members 34, and so that the tabs engage the wedge shaped portions 44 to cause the bottom wall sections to spring apart and receive the post therewithin. The tabs will then lock within the slots 45 as seen for example in FIG. 14, so that the retainer 52 surrounds and grippingly engages the posts.

The internal retainer 49 also is formed of a sheet metal material, and its cross section is configured to closely match the outline of the space between the plates 40 and 41. To effect its assembly between the members 34, one end of the retainer 49 is inserted into the end of one of the members 34 as seen in FIG. 12, and the other member 34 may then be slipped onto the remaining portion of the splice. To prevent the retainer 49 from moving further into the initial member during the assembly of the second member, the retainer 49 may be provided with an aperture 57 in the side wall, which permits the technician to insert a tool, such as a screwdriver, and thereby prevent further sliding of the retainer into the initial member.

The cover 53 is in the form of a V-shaped sleeve which is adapted to underlie the end portions of the abutting members 34 to further reinforce the interconnection. The cover has in-turned flanges 58 along the upper edges, which permit the cover to be assembled by pressing the cover onto the aligned members from below so that the flanges snap over and lock behind the upper edges of the side walls 38, 39 of the members.

Figure 9:
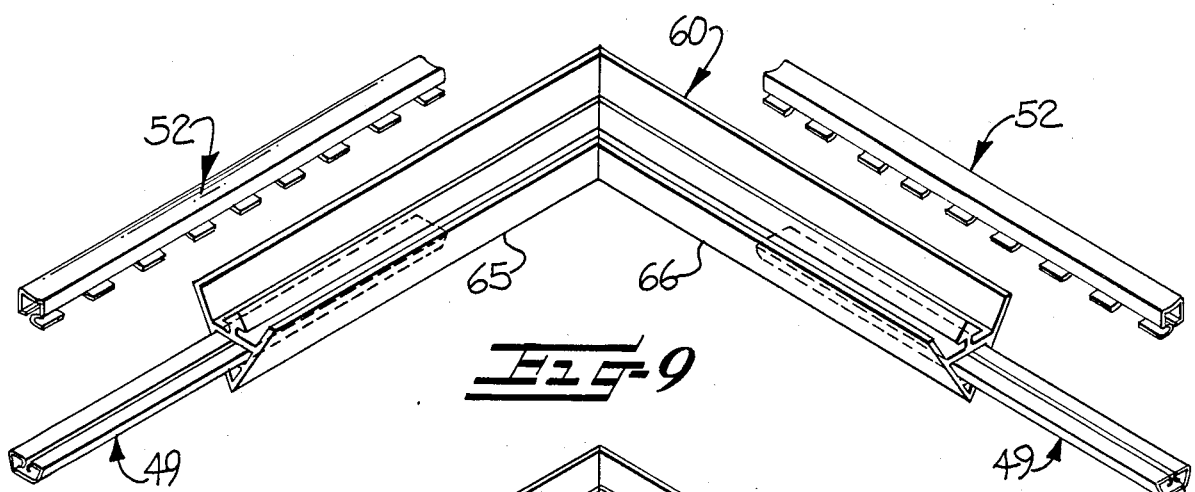
FIG. 9 is an exploded perspective view of one of the mitered corner interconnections of the latticework.
Figure 10:
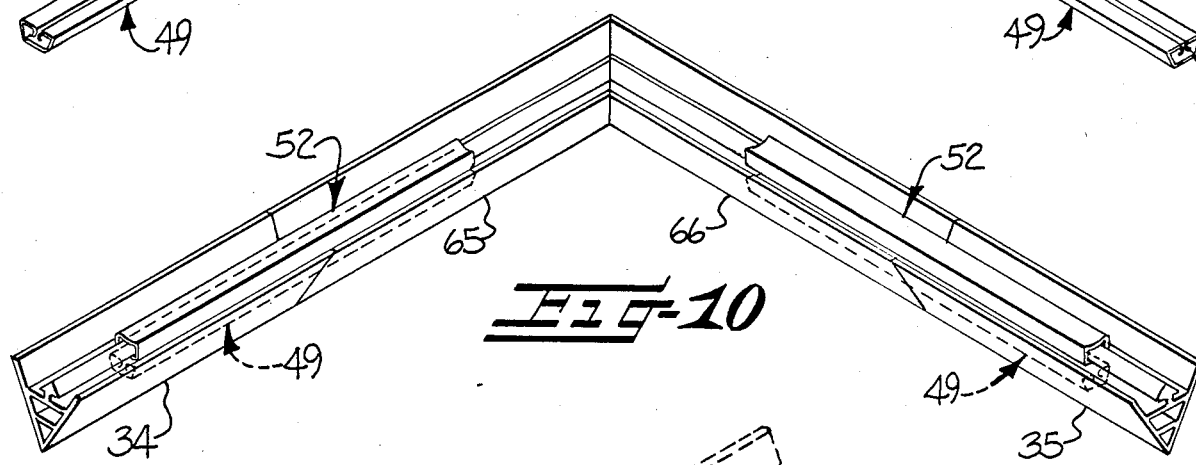
FIG. 10 is a perspective view of an assembled corner interconnection.

The interconnected lengthwise and cross members will be seen to define generally X-shaped interconnections within the interior of the latticework (note FIG. 5), and T-shaped interconnections along the side walls (note FIG. 15). It will also be seen that each end of each cross member 36 abuts the associated lengthwise member 34 at a location intermediate its ends, and that the ends of the two cross members are aligned on opposite sides of the lengthwise member at the generally X-shaped interior interconnections. The lengthwise members 34 and the two end wall members 35 are joined in each of the four corners of the room by a mitered L-shaped interconnection 60 as seen in FIGS. 9 and 10, and the remaining ends of the lengthwise members 34 are joined to an intermediate portion of the length of the end wall members 35 by a T-shaped interconnection 52b similar to that shown in FIG. 15.

At each of the interconnections between the lengthwise and cross members, there is provided a cut-out section 61 in the side wall of the lengthwise member (note FIGS. 5, 6, and 11) which extends downwardly to the level of the associated plate 40 and laterally a distance conforming to the separation of the adjacent portion of the side walls of the associated cross member 36. Thus the plates 40 of the lengthwise and cross members are coextensive. Also, the sealant 48 is positioned upon the coextensive plates continuously about the periphery of each open area of the latticework as seen in FIG. 4.

Each such interconnection further comprises retainer means interconnecting the cross member 36 and the associated lengthwise member 34. At the generally X-shaped interconnections as best seen in FIGS. 5 and 6, a generally X-shaped retainer 52a is provided which has a cross section corresponding to that of the above described retainer 52, and which is adapted to be snapped onto the posts of the associated members 34 and 36. At the T-shaped interconnections as seen in FIG. 15, the retainer 52b has a T-shaped outline, and the retainer 52b is adapted to be snapped onto upon the posts 42 of the two members in the manner described above.

The L-shaped interconnections 60 at each of the four corners of the room each comprise two relatively short sections 65, 66 which conform to the cross sectional configuration of the members 34, 35, and 36, and which are mitered and fixedly interconnected by welding or the like. Each L-shaped interconnection 60 is joined to abutting members 34 and 35, using a retainer 52 and internal splice 49 in the manner described above.

FIG. 11 illustrates a pair of right angled clips 67, which may be utilized in the manner illustrated to reinforce a T-shaped interconnection. The clips 67 have a U-shaped outline in cross section which is slipped over the side walls 38, 39 of the members, and the inside leg of each clip includes a horizontal lip 68 for facilitating its assembly onto the side walls.

FIG. 17 illustrates a support bracket 62, which is adapted to support the latticework from the top wall 11 of the clean room. More particularly, a number of support brackets 62 are each connected to a threaded tie rod 63, which depend from the top wall 11, and which permit the elevation of each support bracket 62 to be adjusted. Each support bracket 62 includes a triangular receptacle 64 along the lower edge, which is adapted to slide onto the wedge shaped portion 44 of the post 42 of the lengthwise member 34 in the manner best seen in FIG. 17, and thereby support the lengthwise member from the top wall. A portion of the post 42 may be removed as indicated at 42a to facilitate the assembly of the receptacle 64 to the post.

To fabricate the above described latticework 30, an L-shaped interconnection 60 is initially installed in each corner of the room, by suspending the interconnection from a support bracket 62 or by any other suitable means. Next, the lengthwise members 34 are installed in a parallel, laterally spaced apart arrangement, with these members also being supported by a number of support brackets 62. The lengthwise members 34 typically have a substantial length, such as about eighteen feet, and depending on the length of the clean room, a number of the members may be joined in an end to end arrangement by the interconnection as shown in FIGS. 12-14. At the four corners, the ends of the members 34 are joined to the aligned ends of the interconnections 60. The end wall members 35 are then mounted along the end walls of the room, and joined to the other ends of the associated interconnections 60.

The cross members 36, which typically have a length of about two feet, may then be installed between adjacent pairs of the lengthwise members 34. A T-shaped interconnection as shown in FIG. 15 is formed between the lengthwise members 34 and the ends of the cross members 36 along two of the side walls of the room, with the assembly being maintained by a retainer 52b which is pressed into the posts 42. In this regard, it will also be noted that the end of each cross member 36 is inclined so as to mate with the side wall of the lengthwise member. The remaining ends of the lengthwise members 34 are also joined to the end wall members 35 along the two end walls of the room, to form similar T-shaped interconnections.

The generally X-shaped interconnections, which are formed at each of the interior corners of the latticework, are formed by bringing the members 36 into position, and joining them by means of the retainer 52a, which is also pressed downwardly onto the posts 42 of the members.

As final steps in the fabrication of the latticework, the sealant 48 is deposited upon the upper plates 40 of the interconnected members, and so that the sealant extends continuously about the periphery of each open area 32. In addition, the lengthwise members 34 and end wall members 35 which form the outer periphery of the latticework 30 are sealed to the side walls of the room by means of a Z-shaped plate 68, which has one leg sealed to the wall of the room and the other leg embedded in the sealant 48, note FIGS. 4 and 18.

An alternative construction for the lengthwise members 34 and end wall members 35 which form the outer periphery of the latticework is shown at 70 in FIG. 19. In this embodiment, these edge members 70 have a modified cross sectional configuration, which includes a vertical side wall 71 which is adapted to be mounted directly against the side wall of the room, to thereby avoid the need for the Z-shaped plate 68 as described above. As will be understood, the L-shaped corner interconnections would have a corresponding outline.

A plurality of air filters 74 are next positioned on the latticework 30, with one of the filters covering each of the open areas 32. Each filter 74 comprises a rectangular frame 75 which is typically fabricated from an extruded metal or plastic material, and which defines a centrally disposed air flow opening, note FIG. 4. A filter pack 76 is sealably disposed within the air flow opening, and comprises a sheet of filtering medium folded in accordion fashion and with the folds thereof lying substantially parallel to the direction of air flow through the filter. As well known in the art, the sheet of filtering medium may be fabricated from glass, ceramic, or cellulosic fibers, or plastic and polytetraflouroethylene (PTFE), and is designed to remove sub-micron size particles from an airstream at extremely high efficiencies. Filters of this type are generally called "absolute" or "HEPA" filters in the industry.

In the illustrated embodiment, the rectangular frame 75 of each filter 74 comprises four separate side panels which are interconnected in an end-to-end rectangular arrangement and in the manner more fully described in copending and commonly owned application Ser. No. 625,304, filed June 27, 1984, and now U.S. Pat. No. 4,584,005. Each of the side panels includes opposite side edges having outwardly and reversely turned flanges 77 (FIG. 7) which define a pair of opposing channels for receiving a right angled corner plate 73, which interconnects the abutting ends of the adjacent side panels.

The frame 75 also defines a downwardly depending integral peripheral flange or skirt 78 positioned about the outer periphery of the frame 75, the skirt being adapted to rest within the receptacles 47 of the members 34, 35, 36 of the supporting latticework and to be sealably embedded in the sealant 48. A protective plastic "eggcrate" grille 80 may be mounted upon the members to cover each open area, and so that the grille is immediately below the downstream face of each filter. Also, the depending skirt 78 of the frame 75 includes an integral, laterally directed shoulder 81, which is designed to engage and rest upon the grille 80, and thereby effectively limit the depth of penetration of the shirt into the sealant. The depending skirt further includes a knife-like edge 79 which projects downwardly from the outwardly turned flange 77 of the frame, and which extends about the entire periphery of the frame. The knife-like edge 79 thereby assures that the flange 78 penetrates the sealant to achieve a proper seal.

A plurality of lighting fixtures 82 may be positioned in selected open areas 32 of the latticework 30. In the illustrated embodiment, each lighting fixture includes a rectangular metal housing 83 which mounts four fluorescent light bulbs 84, and which includes a downwardly depending lower edge 86 which is sized to rest within the receptacles 47 of the interconnected members of the latticework and be embedded in the sealant 48 about the periphery of the open area. Also, the upper edge of the housing mounts a peripheral channel 87 having a sealant 48 positioned therein. A filter 74 is mounted upon the upper channel 87 of the housing, with the depending skirt 78 of the filter frame sealably embedded in the sealant 48.

As noted above, each of the members 34, 35, and 36 has a corresponding, generally V-shaped outline in cross section, and it is preferred that the angular extent of the V-shaped outline be predetermined so as to provide a substantially laminar flow therealong for the particular value of the air flow rate moving through the clean room. By this arrangement, substantially all of the turbulence below the members of a degree able to entrain dust and dirt particles and move the same laterally through the room, may be substantially eliminated. It will also be seen that the receptacles 47 of the interconnected members of the latticework define a continuous, rectangular, upwardly facing open receptacle which surrounds each of the open areas 32. The sealant 48 is positioned upon the plates 40 and within this peripheral receptacle, and such that the depending metal skirts 78 of the filters, and the corresponding skirts 86 of the lighting fixtures 82, are immersed in the sealant 48 so as to form a non-deteriorating and highly efficient seal therebetween. The shoulder 81 on the skirt of the filters is adapted to engage the plastic grille 80, or alternatively the upper edge of the side wall 38, 39 of the members, to hold the lower edge of the skirt somewhat above the cross plate 40, and thereby prevent the skirt from cutting completely through the sealant 48, which could increase the likelihood of leakage of air.

It is preferred that the sealant 48 comprises an essentially non-volatile and non-hardening moldable gumlike plastic material having a consistency substantially the same as modeling clay. More particularly, the sealant may comprise an uncured dimethyl polysiloxane gum having a viscosity of at least about 500,000 centipoise and a molecular weight of at least about 300,000 a m u.

In one preferred embodiment of the invention, the sealant 48 comprises a compounded uncured dimethyl polysiloxane gum which is sold by the General Electric Company under the product identification SE-32, and which has a specific gravity of about 1.15, volatiles of not more than about 3%, a plasticity of between about 150-170 (Williams), a molecular weight of about 300,000 amu, and a viscosity of about 639,000 centipoise. This gum-like material is readily moldable and has a consistency substantially the same as modeling clay, and it is particularly advantageous in the present invention in that it does not readily flow or leak between the cracks formed between the plates 40 of the adjacent members. Thus caulking or other sealing of these cracks is unnecessary. In certain instances, it has been found desirable to place a thin coating of a silicone base grease, or other petrolatum-like fluid, upon the filter skirts, in order to facilitate the insertion and extraction of the skirts into and from the sealant.

Various fillers may be added to the gum resin to provide desirable properties, such as fire retardancy, heat resistance, or improved tensile strength. As a further non-limiting specific example wherein such fillers are employed, the following composition is suitable for use in fabricating the sealant:

50 parts uncured dimethyl polysiloxane gum (General Electric SE-32)
50 parts uncured methyl vinyl polysiloxane gum (General Electric SE-63)
12 parts fumed silica
5 parts red iron oxide
10 parts decabromodiphenyloxide (Great Lakes (Chemical DE83R)

In the above example, the fumed silica acts to increase tensile strength, the iron oxide increases heat resistance, and the phenyloxide is a fire retardant which permits the sealant to meet UL test standard UL 94 V-O, which requires the sealant to be self-extinguishing when exposed to a flame.

In the embodiment of FIGS. 20-25, the lengthwise members 34a, end wall members (not shown), and cross members 36a have a somewhat different cross sectional outline as compared to the embodiment of FIGS. 1-19. In particular, the members 34a and 36a do not include a post 42 as described above, but rather the lengthwise members 34a include an integral support bar 90 extending upwardly from the medial portion of the upper plate 40a for supporting the latticework from the top wall 11 of the clean room. The two end wall members preferably also include an integral support bar, and are thus identical to the lengthwise members 34a.

To connect the members 34a and 36a at the T-shaped interconnections of the latticework, there is provided an elongate opening 91 through one of the side walls 38a, 39a of the lengthwise member 34a and which communicates with the space formed between the upper and lower plates 40a, 41a. Also, the opening 91 is vertically aligned with the cut-out sections 61a of the side walls. A plate-like retainer 92 is slideably mounted in the space between the upper and lower cross plates at each of the ends of the cross members, and so that each retainer 92 extends outwardly from the associated cross member end. The retainer 92 is thus adapted to extend through the opening 91 in the side wall of the adjacent lengthwise member to interconnect the same. Preferably, the plate 40a of each cross member includes a slot 93 adjacent each end, for receipt of a threaded set screw 94 which is received in a threaded bore in the retainer, and which permits the retainer to be locked in its extended position.

The ends of the lengthwise members 34a are joined at an intermediate length of the end wall members (not shown in this embodiment) by a similar T-shaped interconnection which includes an opening in the side wall of the end wall member and a retainer slideably mounted in the end of the lengthwise member so that it may be inserted through the opening of the end wall member.

At the generally X-shaped interconnections as shown in FIGS. 22-24, the lengthwise member 34a is provided with aligned openings 91, 91a in each side wall, and the retainer 92 extends completely through the two aligned openings of the lengthwise member. Thus each retainer 92 interconnects two of the cross members to the associated lengthwise members.

To fabricate the latticework of the embodiment of FIGS. 20-25, the lengthwise members 34a are initially installed in a parallel arrangement, and are supported from the top wall 11 by the integral support bars 90 of the members and tie rods 95. The two end wall members, which preferably also include an integral support bar, are then mounted along the two end walls of the room. Next, the cross members 36a are installed by initially withdrawing the retainer 92 into the cross member, inserting the cross member between the two lengthwise members 34a and in alignment with the openings 91, 91a, and then moving the retainer 92 outwardly by engagement with the set screw 94, and so as to advance its free end through the adjacent opening. The vertical spacing between the upper and lower plates 40a, 41a of the members closely approximates the thickness of the retainer 92 so as to closely receive the retainer 92 therebetween, and if desired, it may be further held by means of a set screw (not shown) which extends through the plate 40a of the lengthwise member to engage the retainer.

The end of the cross member 36a opposite the retainer 92 will be subsequently locked in position by the retainer of the aligned cross member, which has a length sufficient to extend through the member 34a and enter the slot between the upper and lower plates of the cross member. Here again, a further set screw may be employed to lock the retainer to the opposite end of the cross member, if desired. As will also be apparent, the last cross members to be installed will necessarily slideably mount a retainer 92 at each end, so as to permit interconnection between the two final lengthwise members.

The ends of the lengthwise members 34a are joined to the end wall members (not shown) to form a T-shaped interconnection in a manner similar to that described above with respect to the lengthwise and cross members. Also, the four corners of the latticework may be formed by a suitable mitered interconnection between the ends of the lengthwise and end wall members, using an L-shaped outer cover of V-shaped cross section to maintain their assembly in the manner of the cover 53 described above. The latticework is then sealed to the side walls of the clean room, and the receptacles are filled with a sealant 48.

Figure 21:
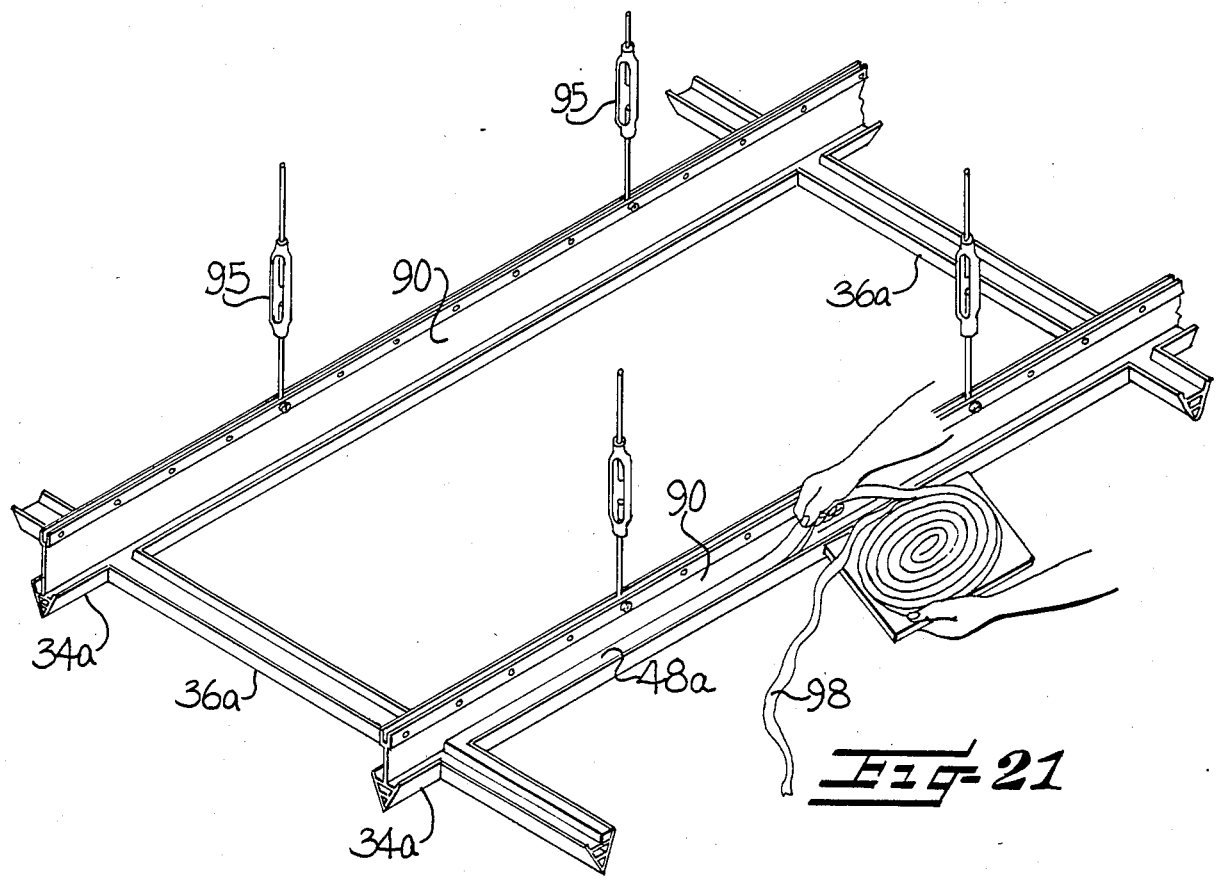
FIG. 21 is a fragmentary perspective view of a portion of the latticework shown in FIG. 20, and further indicating a method for assembling the sealant therein.

To assemble the sealant 48 into the receptacles of the latticework, the sealant may be extruded into an elongate strip 48a, which is preferably wound into a flat coil to facilitate handling and storage as seen in FIG. 21. The strip 48a includes a sheet of release paper 98 or the like adhered to one side edge of the strip, with the release sheet 98 being disposed between adjacent coils to prevent contact between the adjacent coils. Also, the strip 48a is extruded to have a cross sectional shape which generally conforms to the cross sectional shape of that portion of the members above the upper cross plates. The strip 48a may be cut into suitable lengths which are progressively disposed along the plates around the periphery of each open area, while the release sheet 98 is stripped therefrom as seen in FIG. 21. The ends of the cut lengths are brought into abutting contact, and the abutting ends of the polysiloxane sealant will in a short time self amalgamate or diffuse into each other, resulting in a continuous uninterrupted joint which has the same appearance and characteristics of the remaining portions of the strip. Thus any possibility of leakage through the joint formed between the abutting ends of the strip is avoided.

In the embodiment of FIGS. 26–29, the latticework comprises a plurality of generally X-shaped connectors 100 disposed at the corners of the rectangular open areas, with each connector composed of four extensions 102 radiating from a common central location at right angles to each other. A coupling member in the form of a threaded socket 103 is disposed at the central location of each connector, and the threaded socket is adopted to engage one of the tie rods 104 which support the latticework from the top wall 11. A plurality of channels 106 are interconnected respectively between the aligned pairs of extensions 102 of each adjacent pair of connectors 100, to complete the latticework. As will be understood, the connectors along the sides of the latticework will have a T-shaped outline, and the connectors at the corners of the latticework will have a right angled outline. Also, the channels and connectors located about the perimeter of the bank 16 are sealably secured to the adjacent side walls by any suitable means, such as the plate 68 shown in FIG. 18.

Each of the four extensions 102 of each connector 100 is composed of two side walls 108, 109 which are inclined toward each other in a V-shaped arrangement in cross section, and an internal plate 110 extending between the side walls and so that each of the extensions 102 has the cross sectional configuration of an inverted A which defines an upwardly open receptacle. Each extension 102 further includes a retainer 112 of triangular cross section, and which is closely received in the portion of the extension below the plate 110. If desired, the retainer 112 may be slideably received therein, and the plate 110 may be provided with a slot and set screw for controlling its sliding movement as described above with respect to the embodiment of FIGS. 21–25.

The channels 106 have a cross sectional outline corresponding to that of the extensions of the connectors and include side walls 114, 115 and an internal plate 116, and the channels are adapted to slideably receive the extended portions of the retainers 112 to effect their interconnections. The upper surface of the plates 110 of the connectors and the upper surface of the plates 116 of the channels are coextensive, and the sealant 48 is positioned upon these coextensive upper surfaces. Where the above-described gum-like sealing material is employed, it will be appreciated that such material may be extruded to have a cross sectional shape which generally conforms to the cross sectional shape of that portion of the extensions and channels above the surfaces of the plates.

As in the above described embodiments, each of the extensions 102 of the connectors and each of the channels 106 have a corresponding, generally V-shaped outline in cross section, and it is preferred that the angular extent of the V-shaped outline be predetermined so as to provide a substantially laminar flow therealong for the particular value of the air flow rate moving through the clean room, and for the reasons set forth above.

FIGS. 30 and 31 illustrate at 121 a further embodiment of the connectors of a latticework which embodies the present invention. In this embodiment, each connector 121 comprises four radiating extensions 122, with a threaded sleeve 123 fixed at the central location between the arms for joining a tie rod 124. Each of the extensions 122 is formed of two side walls disposed in a V-shaped relationship, with integral tabs 125 extending upwardly from the upper edges thereof. The channels 126 have a mating V-shaped outline, and to assemble the channels to the connectors, the channels are laid into the extensions 122, and the tabs 125 are deformed over the upper edges of the channels to maintain their assembly. A suitable sealant may then be positioned in the connectors and channels for sealably engaging the skirts of the filters in the manner described above.

FIG. 32 illustrates a modification of the embodiment of the connector 100 shown in FIGS. 26-29. In this embodiment, the central portion of the connector includes a ball and socket interconnection 128 which is disposed between the connector and tie rod 124, to facilitate the leveling of the connector. A similar ball and socket arrangement is shown at 129 in FIG. 33, and which is suitable for the embodiment of the connector 121 shown in FIGS. 30 and 31.

In the drawings and specification, there has been set forth preferred embodiments of the invention, and although specific terms are employed, they are used in a generic and descriptive sense only and not for purposes of limitation.

That which is claimed is:

1. A clean room having provision for supplying filtered air vertically therethrough under substantially laminar flow conditions, and which is characterized by the substantial absence of migration of dust or dirt particles laterally through the room, and comprising
   a clean room enclosure including a top wall, a bottom wall, and bounding side walls,
   a filter bank positioned parallel to and spaced below said top wall, said filter bank comprising a supporting latticework composed of a plurality of interconnected members which define a plurality of rectangular open areas, and a plurality of high efficiency air filters positioned on said interconnected members of said supporting latticework, with the filters covering respective ones of said open areas, and a sealant interposed between said members of said supporting latticework and the periphery of each of said filters to form a seal therebetween,
   means for introducing air above each of said filters of said filter bank such that the air flows downwardly through said filters at a predetermined flow rate, and
   each of said members of said latticework including side walls of generally V-shaped outline in cross section so as to provide a substantially laminar flow therealong and so as to substantially eliminate turbulence below the members of a degree able to entrain dust or dirt particles and move the same laterally through the room, and each of said members of said latticework further including an internal plate extending between said side walls and so that each member has a cross sectional configuration in the general form of an inverted A and said internal plate and said side walls of said members define an open receptacle, and with said sealant disposed within said open receptacle.

2. The clean room as defined in claim 1 wherein said sealant comprises an essentially non-volatile and non-hardening moldable gum-like plastic material having a consistency substantially the same as modeling clay.

3. The clean room as defined in claim 2 wherein said sealant further comprises uncured dimethyl polysiloxane gum having a viscosity of at least about 500,000 centipoise and a molecular weight of at least about 300,000 a m u.

4. The clean room as defined in claim 1 wherein each of said filters includes a peripheral flange having a continuous cross sectional outline which generally corresponds to the outline of the associated open area, and with a portion of the peripheral flange being positioned within said open receptacles of the associated members of said latticework and sealably embedded in said sealant.

5. The clean room as defined in claim 4 wherein said peripheral flange of each of said filters includes shoulder means fixed thereto and adaoted to effectively engage the upper edge of one of the side walls of the associated members of said latticework for limiting the depth to which the peripheral flange may penetrate said sealant.

6. A clean room having provision for supplying filtered air vertically therethrough under substantially laminar flow conditions, and which is characterized by the substantial absence of migration of dust or dirt particles laterally through the room, and comprising
   a clean room enclosure including a top wall, a bottom wall, and bounding side walls,
   a filter bank positioned parallel to the spaced below said top wall, said filter bank comprising
   (a) a supporting latticework defining a plurality of rectangular open areas, with said latticework including a plurality of generally X-shaped connectors disposed at the interior corners of the rectangular open areas, with each connector composed of four extensions radiating from a common central location at right angles to each other, a coupling member disposed at said central location, means engaging said coupling member of each connector for supporting the same from said top wall, and a plurality of channels interconnected respectively between the aligned pairs of extensions of each adjacent pair of connectors, and
   (b) a plurality of high efficiency air filters positioned on said supporting latticework with the filters covering respective ones of said open areas, and
   means for introducing air above each of said filters of said filter bank such that the air flows downwardly through said filters at a predetermined flow rate,
   each of said extensions of said connectors and each of said channels including side walls of a corresponding, generally V-shaped outline in cross section so as to provide a substantially laminar flow therealong and so as to substantially eliminate turbulence below the connectors and channels of a degree able to entrain dust or dirt particles and move the same laterally through the room, each of said extensions and said channels further including an internal plate extending between said side walls and so that each extension and channel has a cross sectional configuration in the general form of an inverted A and said internal plate and side walls define an open receptacle, and
   a sealant disposed within said open receptacles of said extensions and said channels and forming a seal between said latticework and said filters.

7. The clean room as defined in claim 6 wherein each of said extensions of said connectors and each of said channels further include a hollow receptacle of triangular configuration in cross section and on the side of said internal plate opposite said open receptacle.

8. The clean room as defined in claim 7 further comprising an interconnecting retainer extending between each extension and its associated channel, with each such retainer being closely received in the respective hollow receptacles of the adjacent extension and channel so as to interconnect the same.

9. The clean room as defined in claim 6 wherein said coupling member of said connectors and said means for engaging said coupling member include ball and socket means for permitting the connectors to be adjusted to a level orientation.

10. A clean room having provision for supplying filtered air vertically therethrough under substantially laminar flow conditions, and comprising a clean room enclosure including a top wall, a bottom wall, and bounding side walls, a filter bank positioned parallel to and spaced below said top wall, said filter bank comprising (a) a supporting latticework composed of a plurality of interconnected members which define a plurality of rectangular open areas, and with each of said members being shaped to define an upwardly facing open receptacle along its length and with the receptacles being in communication about the periphery of each of said open areas, (b) a sealant disposed in said receptacles of said members and so as to extend continuously about the periphery of each of said open areas, said sealant comprising an essentially non-volatile and non-hardening moldable gum-like uncured polysiloxane gum having a consistency substantially the same as modeling clay, and a viscosity of at least about 500,000 centipoise, (c) a plurality of high efficiency air filters positioned on said interconnected members of said supporting latticework, with the filters covering respective ones of said open areas, and with each filter including a peripheral flange which has a continuous cross sectional outline generally corresponding to that of the associated open area, and with a portion of the peripheral flange being positioned within the receptacles of the associated members and sealably embedded in said sealant, and means for introducing air above each of said filters of said filter bank such that the air flows downwardly through said filters at a predetermined flow rate.

11. The clean room as defined in claim 10 wherein said sealant comprises dimethyl polysiloxane gum having no more than about 3% volatiles, a plasticity of about 150-170 (Williams), and a molecular weight of at least about 300,000 a m u.

12. The clean room as defined in claim 10 wherein said sealant comprises a substantially uniform and continuous closed strip about each of said open areas and which is characterized by the absence of a butt end joint.

13. The clean room as defined in claim 10 further comprising shoulder means mounted on each filter and adapted to effectively engage the associated members of the latticework for limiting the depth to which the peripheral flange of said filters may penetrate said sealant.

14. The clean room as defined in claim 10 wherein said peripheral flange of each filter includes a downwardly depending knifelike forward edge for assuring penetration of said sealant.

* * * * *